(12) United States Patent
Takeshita

(10) Patent No.: US 6,339,430 B1
(45) Date of Patent: Jan. 15, 2002

(54) VIDEO GAME MACHINE AND METHOD FOR CHANGING TEXTURE OF MODELS

(75) Inventor: Misaka Takeshita, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/065,714

(22) Filed: Apr. 24, 1998

(30) Foreign Application Priority Data

Apr. 25, 1997 (JP) ............................................. 9-121460

(51) Int. Cl.$^7$ ................................................. G06G 5/02
(52) U.S. Cl. ........................ 345/592; 345/629; 345/646; 382/302
(58) Field of Search ................................. 345/435, 592, 345/646, 439; 382/302

(56) References Cited

U.S. PATENT DOCUMENTS 3,989,889 A * 11/1976 Mendrala ..................... 178/7.2

OTHER PUBLICATIONS

Chang et al. (Chang et al. "Animation: From Cartoons to the User Interface." Proceedings of UIST'93. ACM. Nov. 3–5, 1993.), Nov. 1995.*

Newman et al. Principles of Interactive Computer Graphics. Ch 9 Geometric Models. Ch 25 Shading. 1979. McGraw–Hill Publishing Co. New York.*

* cited by examiner

Primary Examiner—Cliff N. Vo
Assistant Examiner—Philip H. Stevenson
(74) Attorney, Agent, or Firm—Finnegan, Henderson, Farabow, Garrett & Dunner, L.L.P.

(57) ABSTRACT

To create images where the texture of a model changes with a relatively small image data volume three-dimensional model wherein texture changes from one texture to another is obtained by repeatedly superimposing images of the two three-dimensional models while changing the transparency of respective images complementarily.

12 Claims, 12 Drawing Sheets

VIDEO GAME MACHINE AND METHOD FOR CHANGING TEXTURE OF MODELS

BACKGROUND OF THE INVENTION

1. Field of the Invention

The present invention relates to image display in a video game machine, and more particularly to a video game machine for reducing data volume and operation volume when a model whose texture changes is displayed on a TV screen, and improvements in the method for changing texture of the model.

2. Description of the Related Art

In video game machines, there is a need to change the texture of the surface (surface pattern, surface state) of objects and characters located in a virtual space. For example, the pattern on a surface of a "chameleon" may be changed in a game such that the pattern merges with surroundings, or a "rock" may be changed into a precious stone.

One method for obtaining such an image effect is to create multiple steps of a large volume of texture data which changes continuously from a texture 1 of design A to a texture 2 of design B, which is different from texture 1, using a graphics computer, and storing the data in an image database. This database is stored in a large-capacity storage medium, such as a CD-ROM, along with game programs. At a relevant scene in the game, the model data and texture data are read, and a series of textures wherein the design changes in steps are successively pasted onto the surface of the model, so that a texture model which looks as if it is continuously changing from one state to another state is created.

However, when the texture is changed from one state to another state, if it changed slowly, the number of frames of an image increases and the texture pattern data to be prepared becomes huge in volume. The similarly shaped models for applying texture are required in equal number to the number of texture patterns.

Furthermore, texture can be changed only for the number of change steps of the patterns for which texture has been prepared. This means that for each change in the number of frames to be synthesized or the game proceeding selection, a corresponding change pattern is required.

Therefore, the game machine must hold (memorize) a huge volume of pattern data, and requires a high processing capability to create many models in a short time.

SUMMARY OF THE INVENTION

A first object of the present invention is to provide a game machine that can create a model whose texture changes with a relatively small volume of image data.

A second object of the present invention is to provide a game machine that can create a model whose texture changes with a relatively small operation volume.

A third object of the present invention is to provide a method for changing texture of a three-dimensional model that even a CPU with a low processing capability can process.

In order to achieve the aforementioned objects, a video game machine in accordance with the present invention comprises: memory means for memorizing first and second models which are defined with shape and texture; model synthesizing means for obtaining a synthetic model by synthesizing the first model and the second model with a first transparency and second transparency respectively; transparency changing means for changing the first and second transparency complementarily; and display means for displaying the synthetic model on a screen of a monitor.

A further video game machine in accordance with the present invention comprises: memory means for memorizing first and second models which are defined with shape and texture; model synthesizing means for obtaining a synthetic model by overwriting (superimposing) the second model on the first model with a specified transparency; transparency changing means for changing the transparency continuously; and display means for displaying the synthetic model on a screen of a monitor.

According to a video game machine composed in this way, texture morphing can be implemented with a relatively small image data volume and small operation volume.

Preferably, the transparency changing means determines the amount of change of the transparency according to the number of frames of the synthetic model to be displayed on the monitor.

Preferably, the first and second models have the same image. This allows morphing to be implemented wherein the texture of the model changes from one texture to the other without changing the shape of the model.

Preferably, the first and second models have a common shape in each frame, but the shape is different between adjacent frames. This allows morphing to be implemented wherein both the shape and texture of the model change.

A method for changing texture of a model in accordance with the present invention comprises the steps of: memorizing first and second models which are defined with shape and texture; setting a first and second transparency for the first and second models respectively; correcting the first and second models with the first and second transparency respectively and synthesizing both of the corrected models; displaying the synthetic model on a screen of a monitor; and repeating the first to fourth steps while changing the first and second transparency complementarily. This method allows a model to be obtained whose texture changes, with a relatively small image data volume and small operation volume. Another method for changing texture of a model in accordance with the present invention comprises the steps of: memorizing the first and second models which are defined with shape and texture; obtaining a synthetic model by overwriting the second model on the first model with specified transparency; displaying the synthetic model on a screen of a monitor; and repeating the first to third steps while changing the transparency continuously. This method allows a model to be obtained whose texture changes, with a relatively small image data volume and small operation volume.

An information recording medium of the present invention records programs for causing a computer system to function as one of the game machines described above.

DESCRIPTION OF THE PREFERRED EMBODIMENTS

Figure 1:
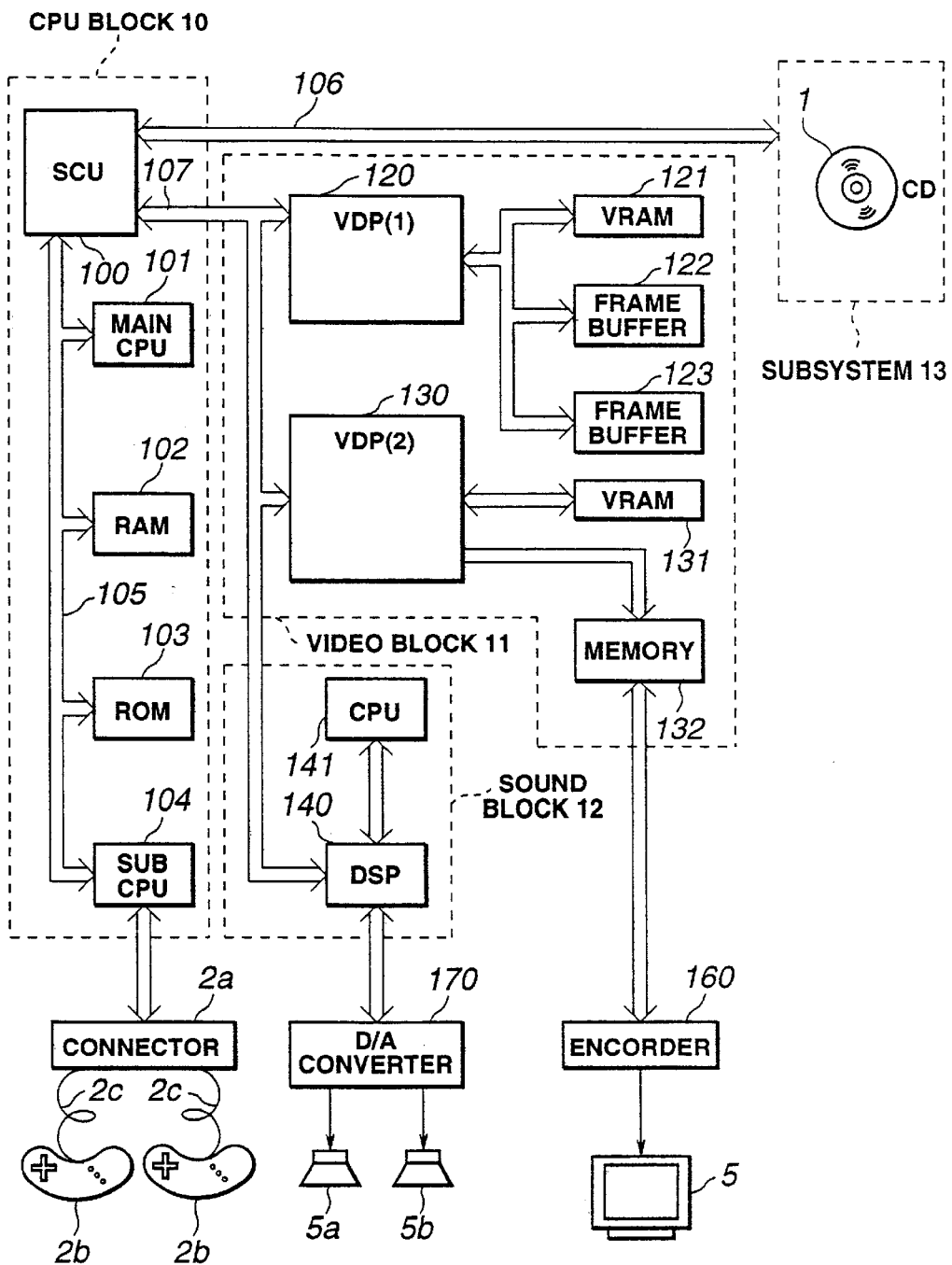
FIG. 1 is a block diagram depicting the general circuit configuration of the video game machine.

FIG. 1 is a block diagram of a video game machine that illustrates an embodiment of the invention. The video game machine includes a CPU block 10 for controlling the entire machine, a video block 11 for controlling the display of a game screen, a sound block 12 for generating sound effects and other sounds, and a subsystem 13 for reading a CD-ROM.

Embodiments of the present invention will now be described with reference to the accompanying drawings.

The CPU block includes an SCU (System Control Unit) 100, a main CPU 101, a RAM 102, a ROM 103, a sub CPU 104 and a CPU bus 105. This block is a major component of the video game machine for processing a game.

The CPU 10 arranges objects, characters and background in a virtual space (RAM 102) on a computer system to create a virtual game space. In this space, an instruction from an input unit 2b is processed according to a game algorithm, and movement of such objects as characters and screen display are controlled. The CPU block 10 includes the SCU (System Control Unit) 100, the main CPU 101, the RAM 102, the ROM 103, the sub CPU 104 and the CPU bus 105.

The main CPU 101 has a built-in DSP (Digital Signal Processor) and can execute a computer program at high-speed. The RAM 102 stores an application program and information of various image data transferred from the sub system 13 for reading the CD-ROM, and is also used as a work area of the main CPU 101. The ROM 103 stores an initial program for initialization processing, which is performed in the initial state of the game machine. The SCU 100 controls data transfer which is performed via buses 105, 106 and 107. The SCU 100 has a built-in DMA controller for transferring image data required during the execution of a game to a VRAM 121 or 131 in the video block 11.

The input unit 2b functions as information input means of a user, and is equipped with various buttons required for operation. The sub CPU 104, which is called SMPC (System Manager & Peripheral Control), collects data (peripheral data) from the input unit 2b via a connector 2a according to a request from the main CPU 101. The main CPU 101 performs processing, such as moving an image displayed on the display (moving a virtual camera), according to the peripheral data transferred from the sub CPU. The sub CPU 104 judges the type of peripheral equipment connected to the connector 2a, (a terminal at main body side), and collects peripheral data according to the communication system of the peripheral equipment type.

The video block 11 functions as model creating means and model synthesizing means of the present invention, and has a VDP (Video Display Processor) 120 for generating images to display using polygons, and a VDP 130 for synthesizing images for background, synthesizing model images, processing hidden surfaces and clipping. The VDP 120 is connected to the VRAM 121 and to frame buffers 122 and 123.

To generate an image in the virtual space (hereafter referred to as "virtual image") to be displayed on the display, polygon data required for displaying is transferred from the main CPU 101 to the VDP 120 via the SCU 100, and is written to the VRAM 121. The polygon data written to the VRAM 121 is stored to the frame buffer 121 or 123 for drawing as drawing data that includes 16 bits or 8 bits per pixel of color information. The stored drawing data is transferred to the VDP 130. The main CPU 101 supplies control information for controlling drawing to the VDP 130 via the SCU 100. The VDP 130 processes the drawing data according to this control information.

The VDP 130, which is connected to the VRAM 131, has a scroll function for moving an entire display screen vertically and horizontally and for rotating the screen, and a priority function for deciding the display sequence of many display screens. The VDP 130 outputs drawing data to an encoder 160 via a memory 132. The encoder 160 converts the drawing data to a video signal format, performs D/A conversion, and outputs the data as video signals. A monitor unit 5 displays images based on the video signals.

The VDP 120, in particular, generates a polygon for the image data (drawing command, polygon data) specified and transferred by the CPU 100, according to the texture mapping algorithm specified by the CPU, pastes the specified texture onto the surface of the polygon to create a texture model, and stores the texture model in the frame buffer 121 or 123. If necessary, shading can be performed on texture. Image data for multiple texture models can be stored in the image database of the CD-ROM, and this data can be loaded to the VRAM 121, or to the frame memory 121 or 123.

The VDP 130 then reads a set of texture models stored in the frame buffer 121 or 123 according to the drawing command which the CPU 101 transferred, and superimposes images of each model with the respective specified transparency to synthesize a texture model. The synthesized texture model is output to the memory 132. This synthesis processing is performed for a number of times (number of frames) specified by the CPU 100, while changing the transparency of each model complementarily. By this processing, a moving image of the model where one texture changes into another, namely, texture morphing, is obtained on the screen of the monitor 5.

The sound block 12 comprises a DSP 140 for performing voice synthesis by a PCM or FM system, and a CPU 141 for controlling the DSP 140. The voice data generated by the DSP 140 is converted to 2-channel signals by a D/A converter 170, and is then output to speakers 5a and 5b.

The sub system 13 includes a CD-ROM drive, and has a function for reading application software to be supplied by recording media, such as a CD-ROM, and for generating moving images.

The general operation of the video game machine will be described next, referring to the flow chart shown in FIG. 2.

Figure 2:
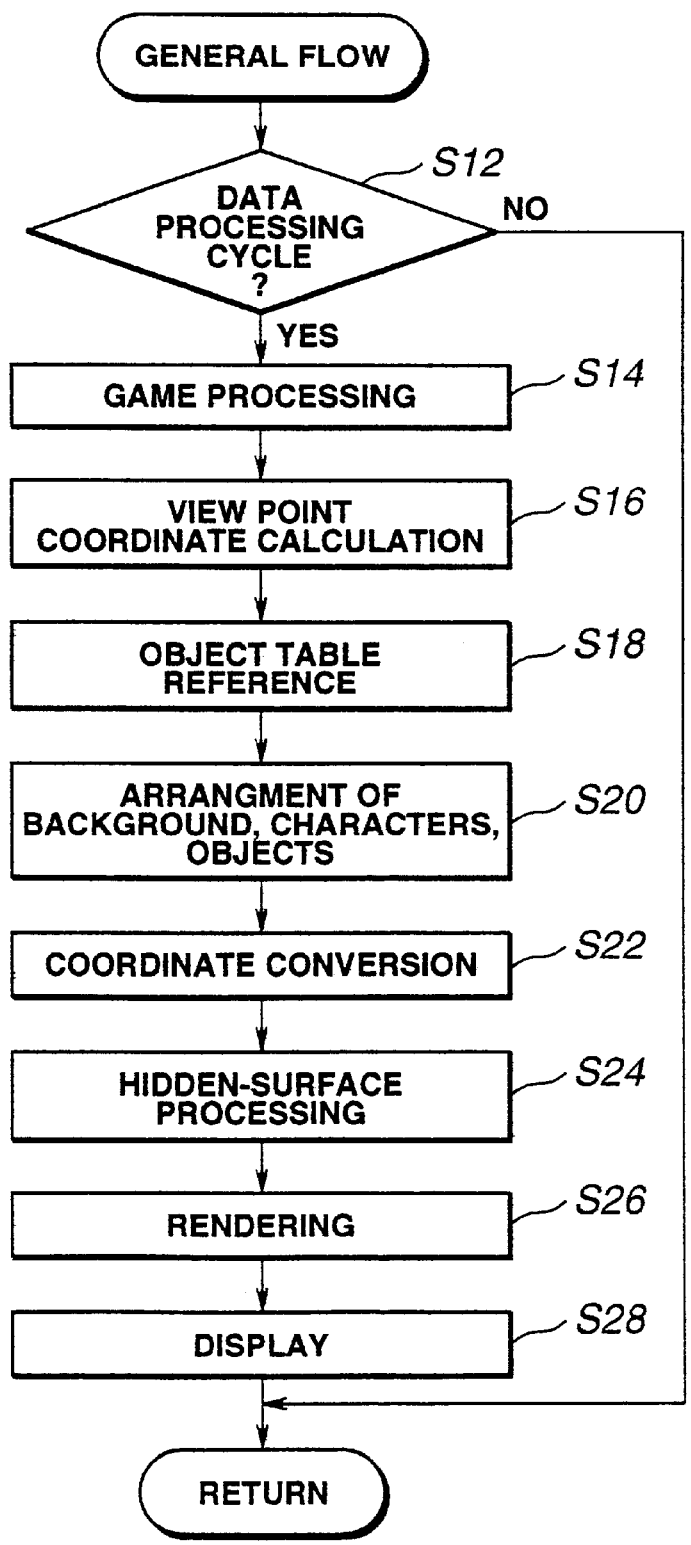
FIG. 2 is a flow chart depicting the general operational flow of the video game machine.

In FIG. 2, interrupt signals with a cycle corresponding to a vertical synchronization signal of a video signal is generated by a system clock signal (not illustrated) in the CPU block 10. When this interrupt signal is supplied to the CPU 101, an interrupt flag is set in a register of the CPU 101. When an interrupt is generated (S12; Yes), the CPU executes processing of S14–S28.

This means that game processing is executed at each cycle of the vertical synchronization signal (every $\frac{1}{60}$th second in an NTSC system) (S14). For game processing, the CPU 101 monitors the output of the input unit 2b, and develops the game by processing input operation by a player according to an algorithm of the game. If the input unit 2b selects a specific position or object on the screen, or if a specific scene is displayed during this game, for example, a flag is set so that morphing to change the texture of the model is implemented.

Thereupon, image creation and screen display processing are executed to create a screen to be displayed on the monitor. In the case of a 3-D game, a view point coordinate system in a three-dimensional game space is calculated (S16).

The CPU 101 refers to an object table which corresponds to a position of a virtual camera in the game space (S18), and arranges images including background data, character data, and object data, which should be present in the visual field of the camera, in the game space (S20), and converts the coordinates of these images and the images described above to the view point coordinate system (S22).

Figure 3:
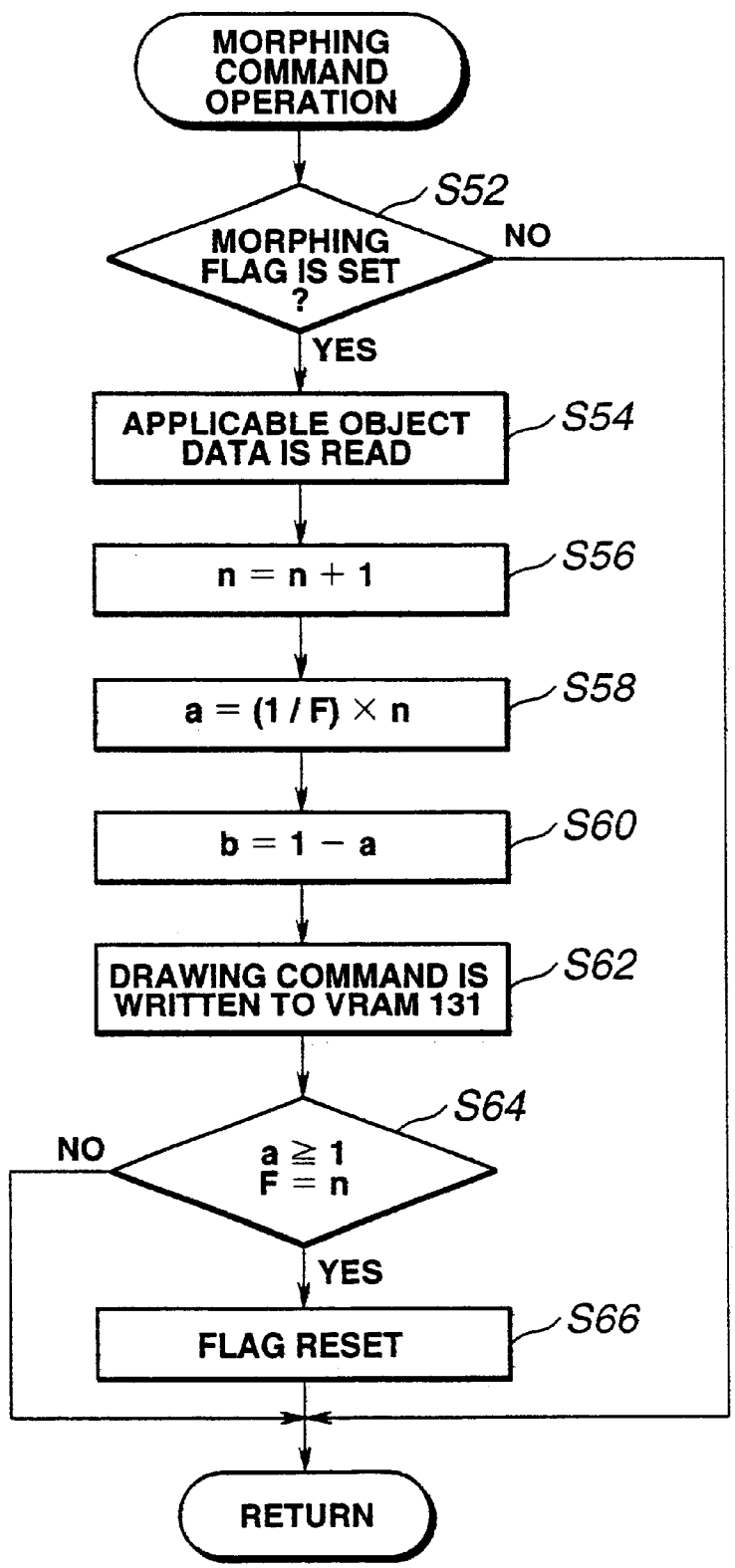
FIG. 3 is a flow chart depicting the process of creating a drawing command.

The CPU then performs hidden-surface processing for each polygon using a Z sort algorithm or other algorithm (S24), and also performs rendering processing including pasting texture on each polygon (S26). An image for which rendering processing has been performed is stored in the frame buffer, and is then displayed on the display (S28). The CPU then returns to step 12, and repeats processing of S12 to S28 every $\frac{1}{60}$ seconds to develop the game. Referring to FIG. 3, texture morphing of the model will be described next.

When a flag for morphing is set in the game processing (S14) described above, a routine to create a drawing instruction for performing pseudo-morphing shown in FIG. 3 is executed (S52; Yes). Firstly, data of a model to be the object of morphing is read (S54). The data is read by setting the morphing flag and writing the number of the model to the register or by referring to supplementary notes in an object table. Drawing data for the morphing model includes model numbers M1, M2 and the number of change frames F. The number of change frames F corresponds to a morphing period of the time axis of a video signal.

The CPU 101 counts the number of a built-in register n, which is initially reset. The register n records the number of frames after morphing processing starts (S56). The ratio of change per morphing cycle is determined by calculation (I/F). To determine the amount of change a ($0 \leq a \leq 1$) in the current frame, (I/F)×n is calculated (S58). The amount of change b, which changes complementarily with the amount of change a, is determined by calculation (1−a). The amount of change b is a value in the range of $1 \leq b \leq 0$ (S60).

A drawing command to draw the model M1 with transparency a and the model M2 with transparency b is created and written to the VRAM 121 via the SCU 100 and VDP 120 (S62).

It is then judged whether the ratio of change a is a $\geq 1$ or whether the number of frames n after change starts matches the specified number of change frames F (S64). If morphing for the specified number of frames has not been performed (S64; No), the morphing flag remains in an ON state during the processing of the next frame, and the creation and transmission of the drawing command with a different transparency is repeated.

If morphing for the specified number of frames has been performed (S64: Yes), the morphing flag is reset (S66). This stops morphing of the model from the next cycle.

Figure 4:
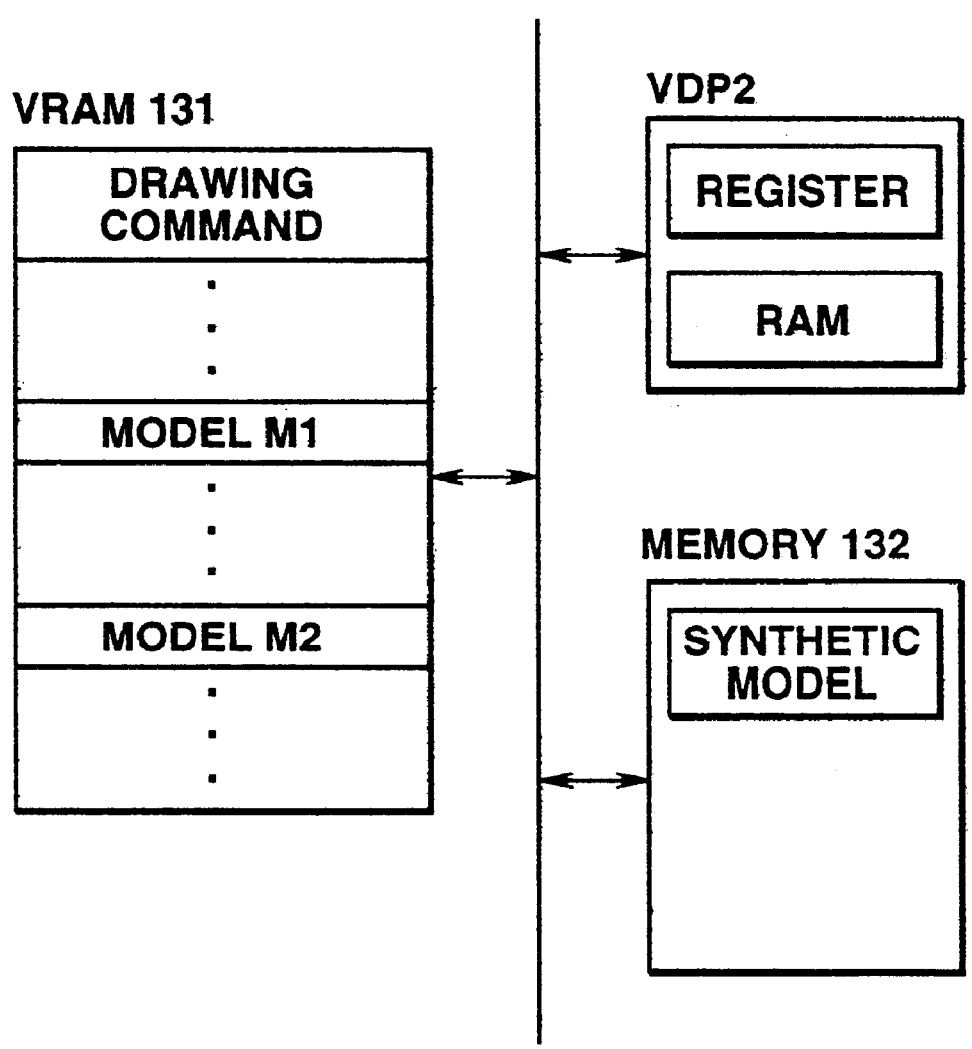
FIG. 4 is a block diagram depicting the operation of a VDP 2 which creates a synthetic model.
Figure 5:
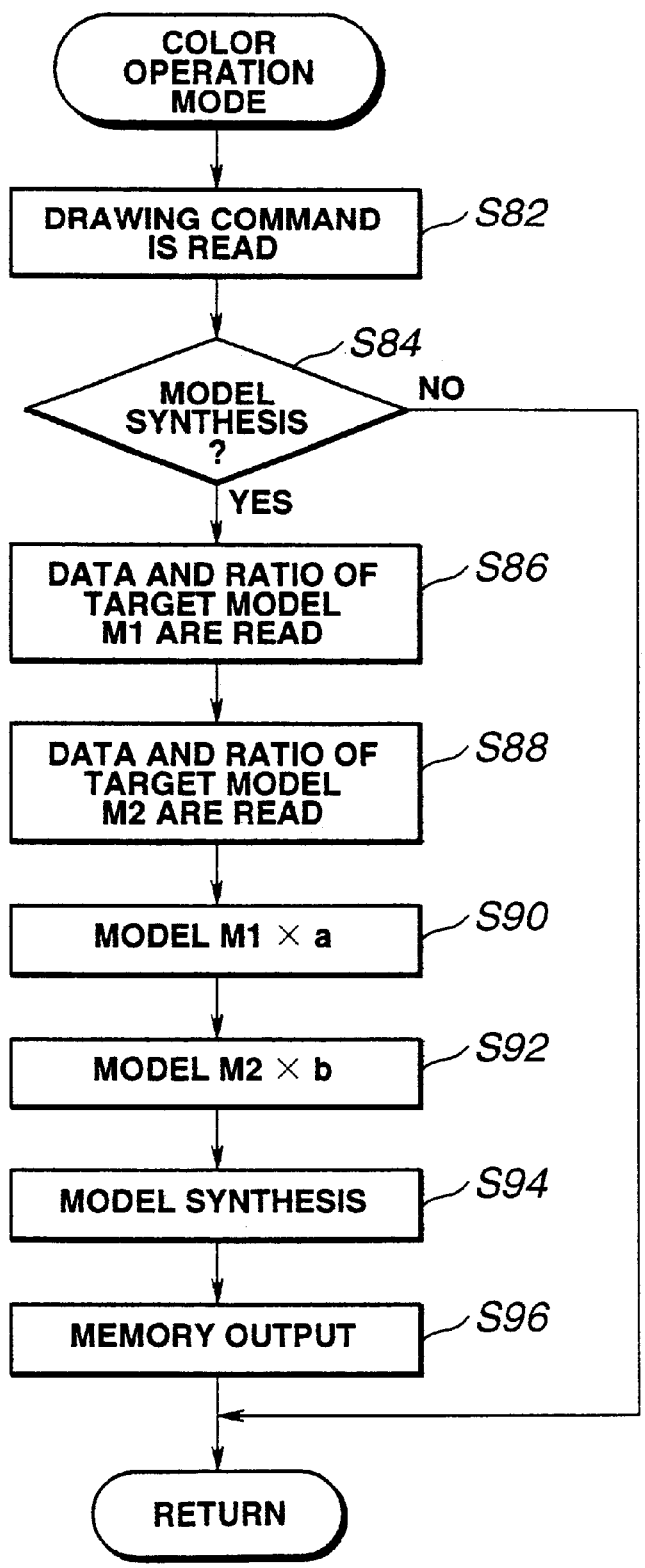
FIG. 5 is a flow chart depicting the process of synthesizing a model.

FIG. 4 and FIG. 5 show a block diagram for describing the morphing processing of the VDP, and a flow chart for describing the flow of this processing.

First, the CPU 101 writes a drawing command in a command area of the VRAM 131. Image data for the models M1 and M2 to be the objects of the drawing command is also written to the data area. In this example, the model data includes shape information relating to objects and characters, etc. and texture information relating to the surface of the shape. The VDP 2 is a processing unit having a composition especially suitable for image data processing, and it includes an operating section, a register and a RAM. The VDP 2 loads the drawing command from the VRAM 131 to the built-in register, decodes the command, and executes processing (S82).

When the drawing command is a synthesis instruction (M1, M2, a, b) to instruct synthesis of the models A and B (S84; Yes), the VDP 2 loads image data for the model M1 from the VRAM 131 (S86), and multiplies the image data in R.G.B. format by the transparency a, to create a model M1' with transparency a (S90). Then the VDP 2 loads image data for the model M2 from the VRAM 131 (S88), and multiplies the image data in R.G.B. format by transparency b, to create a model M2' with transparency b (S92). As described previously, the transparency a and b are ratios specified by the CPU 101, and have the relationship a+b=1. Image data for the model M1' and model M2' are added to synthesize the two models. The synthesized model has the same shape as the original models but the textures of the original models are superimposed according to the respective transparency (S94). This synthetic model is output to the memory 132 (S96).

As the CPU 101 writes the drawing command while changing the transparency according to the number of required frames, the synthesis model to be written to the memory 132 changes from the texture of one model to the texture of the other model. The content of the memory 132 is displayed on the monitor 5 via the encoder 160.

Figure 6:
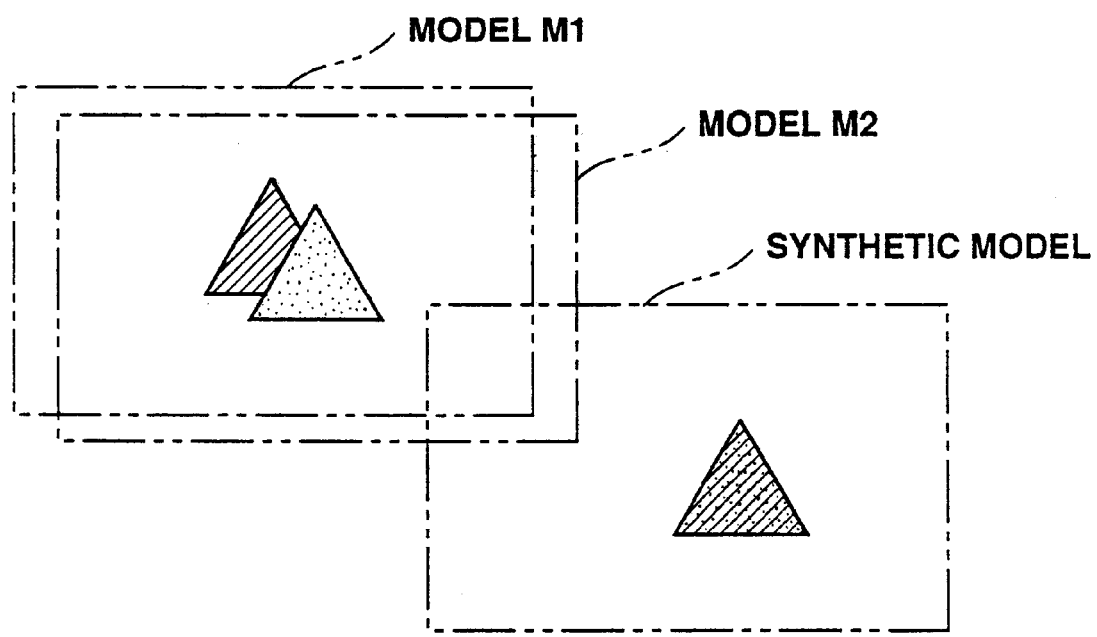
FIG. 6 is a block diagram depicting the concept of model synthesis.

FIG. 6 is a schematic diagram that describes the change of texture in one frame of an image when the two models described above are synthesized while changing transparency complementarily. In FIG. 6, the synthetic model has been synthesized with the transparency a of the model M1 and the transparency b of the model M2.

FIG. 7 to FIG. 14 are explanatory drawings depicting results of texture morphing in accordance with the present invention. In this example, the first model is a flag where alphabetic characters are displayed on a ground pattern. The second model is a flag where polka dots are displayed.

Figure 7:
FIG. 7 is an explanatory drawing illustrating an example of a synthesis result image when the ratio of texture of the first model is 100%, and the ratio of texture of the second model is 0%.
Figure 8:
FIG. 8 is an explanatory drawing illustrating an example of a synthesis result image when the ratio of texture of the first model is 80%, and the ratio of texture of the second image is 20%.

FIG. 7 shows a synthetic image when the ratio of the texture of the first model is 100% (transparency: 0%) and the ratio of the texture of the second model is 0% (transparency: 100%). FIG. 8 shows a synthetic image when the ratio of the texture of the first model is 80%, and the ratio of the texture of the second model is 20%.

Figure 9:
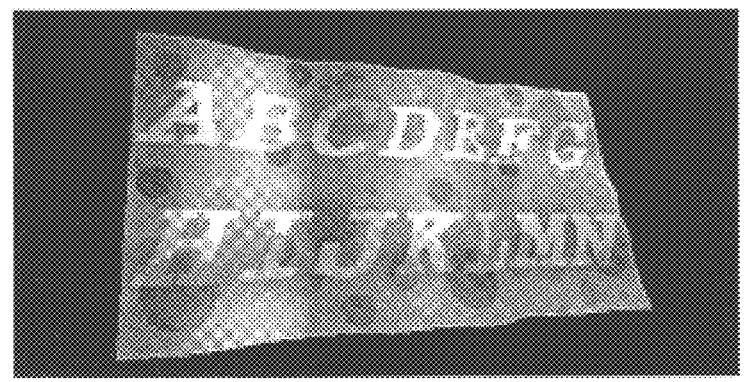
FIG. 9 is an explanatory drawing illustrating an example of a synthesis result image when the ratio of texture of the first model is 60%, and the ratio of texture of the second model is 40%.

FIG. 9 shows a synthetic image when the ratio of the texture of the first model is 60%, and the ratio of the texture of the second model is 40%.

Figure 10:
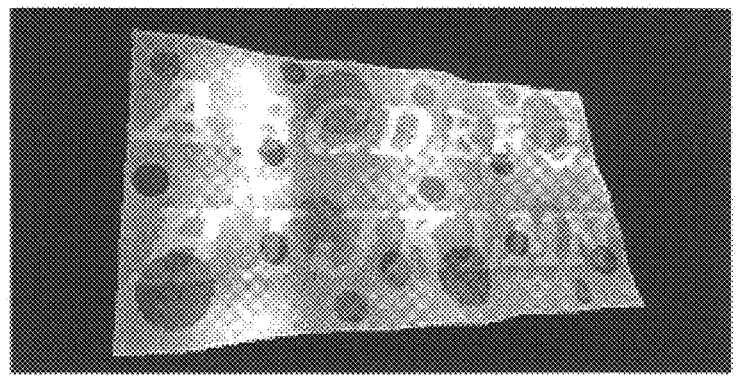
FIG. 10 is an explanatory drawing illustrating an example of a synthesis result image when the ratio of texture of the first model is 40%, and the ratio of texture of the second model is 60%.

FIG. 10 shows a synthetic image when the ratio of the texture of the first model is 40%, and the ratio of the texture of the second model is 60%.

Figure 11:
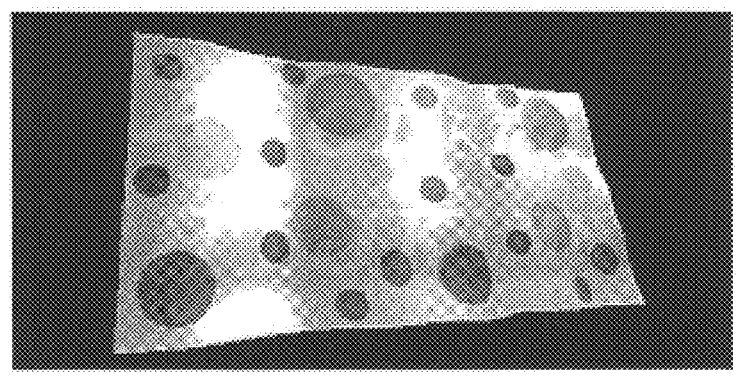
FIG. 11 is an explanatory drawing illustrating an example of a synthesis result image when the ratio of texture of the first model is 20%, and the ratio of texture of the second model is 80%.

FIG. 11 shows a synthetic image when the ratio of the texture of the first model is 20%, and the ratio of the texture of the second model is 80%.

Figure 12:
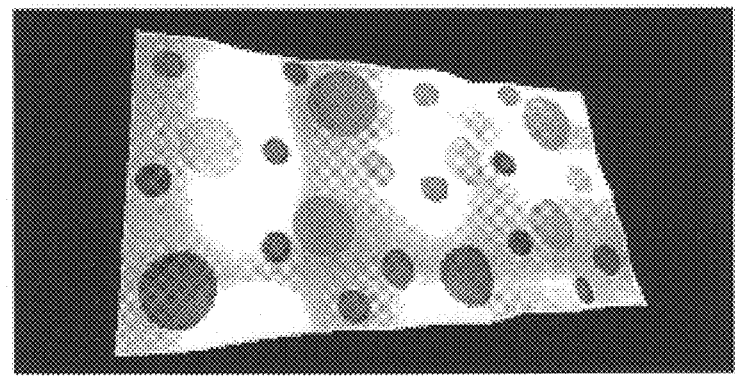
FIG. 12 is an explanatory drawing illustrating an example of a synthesis result image when the ratio of texture of the first model is 0%, and the ratio of texture of the second model is 100%.

FIG. 12 shows a synthetic image when the ratio of the texture of the first model is 0%, and the ratio of the texture of the second model is 100%.

Figure 13:
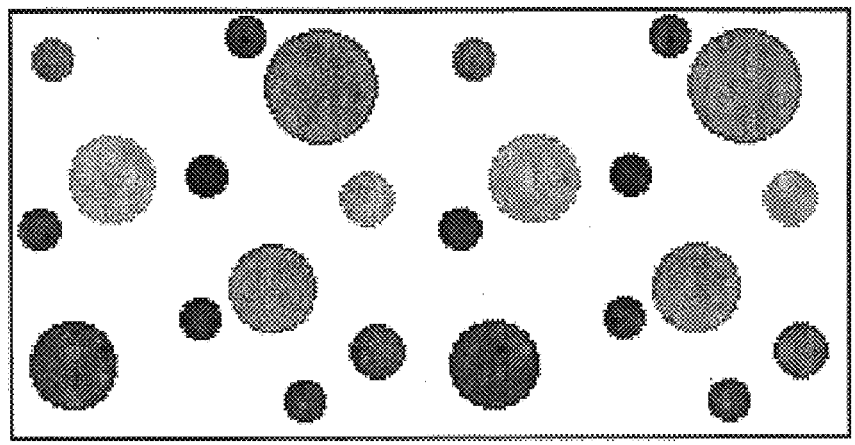
FIG. 13 is an explanatory drawing depicting an example of texture (polka dots) which is used for the second model.
Figure 14:
FIG. 14 is an explanatory drawing depicting an example of texture (character pattern) which is used for the first model.
Figure 15:
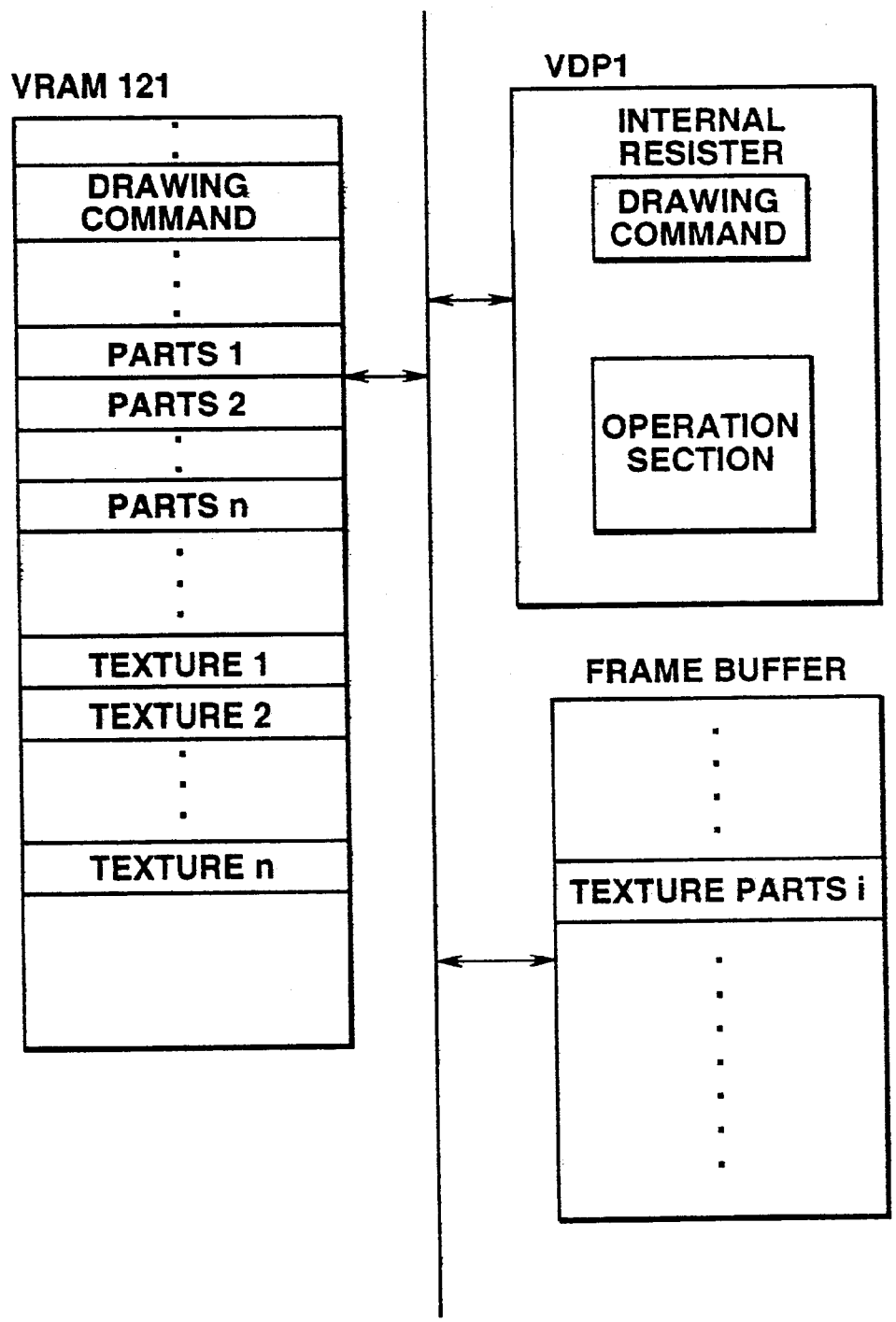
FIG. 15 is a block diagram depicting the circuit configuration when a comparative example is executed.
Figure 16:
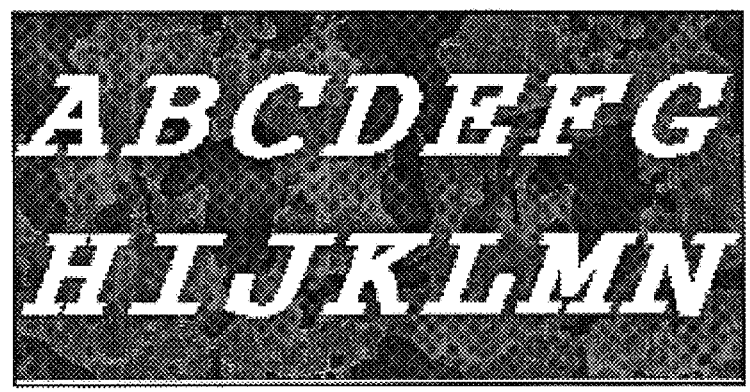
FIG. 16 is an explanatory drawing depicting texture in the first step of morphing of the comparative example.
Figure 17:
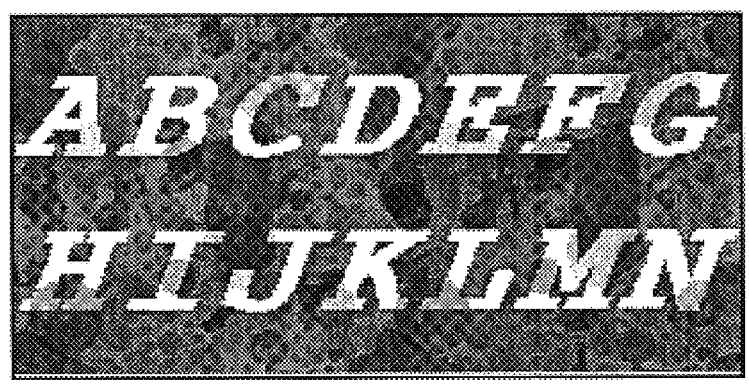
FIG. 17 is an explanatory drawing depicting texture in the second step of morphing of the comparative example.
Figure 18:
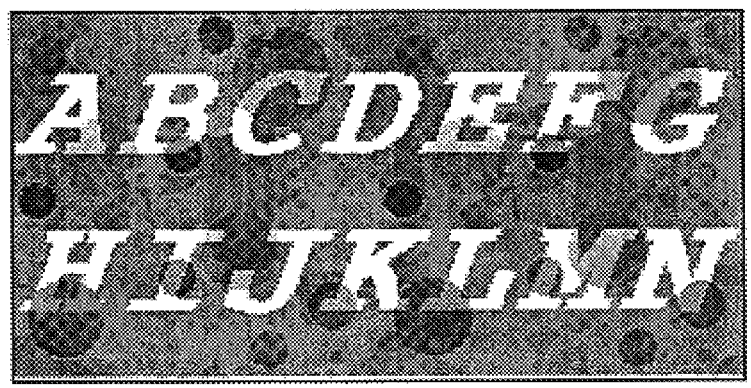
FIG. 18 is an explanatory drawing depicting texture in the third step of morphing of the comparative example.
Figure 19:
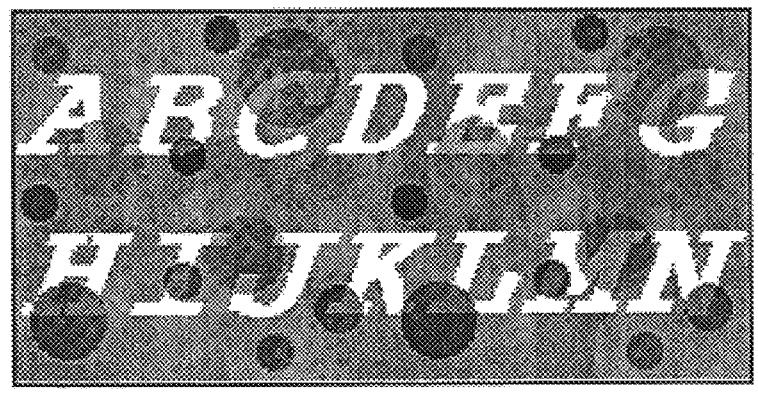
FIG. 19 is an explanatory drawing depicting texture in the fourth step of morphing of the comparative example.
Figure 20:
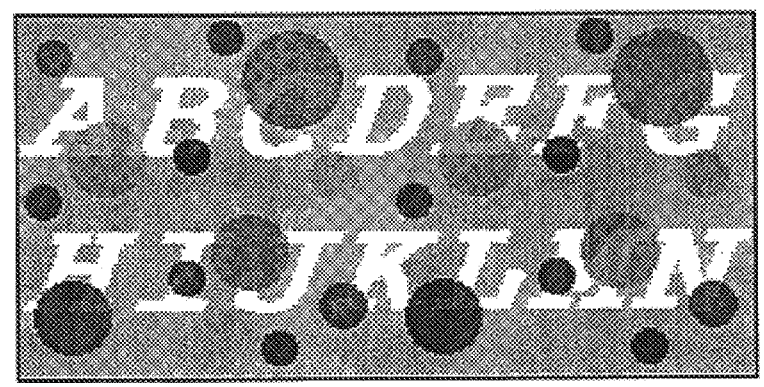
FIG. 20 is an explanatory drawing depicting texture in the fifth step of morphing of the comparative example.
Figure 21:
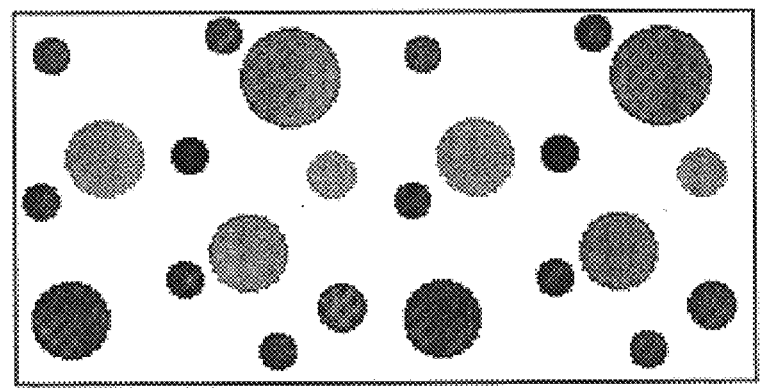
FIG. 21 is an explanatory drawing depicting texture in the sixth step of morphing of the comparative example.

In this processing, only two textures, the polka dots shown in FIG. 13 and the text pattern shown in FIG. 14, are used.

In this way, a three-dimensional model wherein texture changes continuously can be obtained by superimposing the image of the first three-dimensional model where the first texture is created on the surface, and the image of the second three-dimensional model where the second texture is created on the surface while changing the transparency of the respective image complementarily. This method is of course applicable to a plane (2-D) model.

FIG. 15 to FIG. 21 are explanatory drawings depicting a comparative example which implements texture morphing similar to the present invention, and these drawings are used to describe the effectiveness of the present invention.

In the comparative example, all texture data (FIG. 19 to FIG. 21) and parts corresponding to each step of morphing (FIG. 7 to FIG. 12) are prepared as a database.

The CPU 10-1 writes each part 1-n corresponding to each step of morphing and the corresponding texture 1-n to the VRAM 121. In the first frame, the VDP 1 creates a model 1 by pasting texture 1 to the part 1. The model 1 is output to the frame memory. In the second frame, the VDP 1 creates a model 2 by pasting texture 2 to the part 2. The model 2 is output to the frame memory. Texture morphing is performed by repeating this processing.

With the method of the comparative example, however, the volume of the held (memorized) image data is huge, and the volume of operation processing is large. Considering the processing capability of a CPU and the capacity of a memory to be mounted on a home video game machine, it is difficult to implement this method. When texture is displayed with 120×40 dots, for example, the total number of pixels of texture in the comparative example is 28,800 (=120×40×6 dots), but in the present embodiment, 9600 (=120×40×2 dots) is sufficient. Concerning the number of models, the comparative example requires six, while the present embodiment requires only two.

The reference drawings of the above described FIG. 7 to FIG. 12, FIG. 13 and FIG. 14, and FIG. 16 to FIG. 21, which were output with color printing, are attached as a separate document to be submitted along with this application. The effect of texture morphing can be more clearly appreciated by means of these color drawings.

The above embodiment was described using an example where the respective transparencies of two models are changed complementarily, but a greater number of models can be also synthesized. When three models are synthesized, for example, the transparency a, b and c of each model must be a+b+c=1. a and b may change complementarily while the value of c is fixed. It is also possible to change a group, a and b, and c complementarily. When the VDP synthesizes images of two or more models, if the VDP has a function (priority) that synthesizes the models according to the specified priority, then the priority function can be utilized. When a priority is set for the models, only the transparency of the model for which the priority setting is higher is changed, and the model for which transparency was processed is superimposed on another model for which the priority setting is lower. (Drawing priority is determined such that the model with the higher priority is displayed on the top layer on the monitor screen.) This method allows an effect to be obtained similar to the method where transparency is changed complementarily.

It is preferable not to change the shape of the first and second models so as not to increase the image data volume and data processing quantity, but in this case only texture morphing is implemented. If the shape of the first and second models is changed to another shape in each frame, in addition to the change of texture, then it is possible to implement morphing where shape and texture change as a whole.

As described above, the present invention can create a model where texture changes in any number of steps if two models, one before a change and another after a change, are available. The volume of memorizing data required to display dynamic change (morphing) at this time can be small. Compared with the case of drawing a texture model created at each step of change, the operation volume is small, which allows moving images to be obtained wherein texture on the surface of objects and characters changes, even if the CPU has a relatively small processing capability, as in the case of a domestic game machine.

What is claimed is:

1. A video game machine comprising:
memory means for memorizing first and second models, which are defined with shape and texture;
model synthesizing means for obtaining a digital synthetic model by synthesizing said first model and said second model with a first transparency and a second transparency, respectively;
transparency changing means for changing said first and second transparency complementarily; and
display means for displaying said synthetic model in a part of the display screen of a monitor;
wherein said first and second models have the same shape to which said texture is applied and are located at the same position on the display screen.

2. The video game machine according to claim 1, wherein
said transparency changing means determines the amount of change of said transparency by the number of frames of said synthetic model to be displayed on said monitor.

3. The video game machine according to claim 1, wherein said first and second models are of the same shape.

4. The video game machine according to claim 1, wherein said first and second models have a common shape in each frame but the shape is different between adjacent frames.

5. An information recording medium, wherein programs for causing a computer system to function as the video game machine described in claim 1 are recorded.

6. A video game machine comprising:
   memory means for memorizing first and second models, which are defined with shape and texture;
   model synthesizing means for obtaining a synthetic model by overwriting said second model on said first model with a specified transparency;
   transparency changing means for changing said transparency continuously; and
   display means for displaying said synthetic model in a part of the display screen of a monitor;
   wherein said first and second models have the same shape to which said texture is applied and are located at the same position on the display screen.

7. The video game machine according to claim 6, wherein said transparency changing means determines the amount of change of said transparency by the number of frames of said synthetic model to be displayed on said monitor.

8. The video game machine according to claim 6, wherein said first and second models are of the same shape.

9. The video game machine according to claim 6, wherein said first and second models have a common shape in each frame but the shape is different between adjacent frames.

10. An information recording medium, wherein programs for causing a computer system to function as the video game machine described in claim 6 is recorded.

11. A method for changing texture of a model comprising the steps of:
    memorizing first and second models, which are defined with shape and texture;
    setting the first and second transparency for said first and second models, respectively;
    correcting said first and second models with said first and second transparency, respectively, and synthesizing the two corrected models;
    displaying said synthetic model in a part of the display screen of a monitor; and
    repeating said first to fourth steps while changing said first and second transparency complementarily;
    wherein said first and second models have the same shape to which said texture is applied and are located at the same position on the display screen.

12. A method for changing texture of a model comprising the steps of:
    memorizing first and second models, which are defined with shape and texture;
    obtaining a synthetic model by overwriting said second model on said first model with a specified transparency;
    displaying said synthetic model in a part of the display screen of a monitor; and
    repeating said memorizing, obtaining, and displaying steps while changing said transparency continuously;
    wherein said first and second models have the same shape to which said texture is applied and are located at the same position on the display screen.

* * * * *